United States Patent [19]
Brenig

[11] 3,882,373
[45] May 6, 1975

[54] CONTROL DEVICE FOR POWER LINE VOLTAGE MEASURING CIRCUIT

[75] Inventor: Theodore Brenig, Lynchburg, Va.
[73] Assignee: General Electric Company
[22] Filed: May 6, 1974
[21] Appl. No.: 467,103

[52] U.S. Cl. ............... 323/66; 323/93; 324/126; 340/310
[51] Int. Cl. ................ G05f 1/56; G05f 1/64
[58] Field of Search ........... 323/64, 65, 66, 76, 93, 323/61; 340/310; 324/126

[56] References Cited
UNITED STATES PATENTS
2,756,414  7/1956  Doremus ..................... 324/126 X
3,458,764  7/1969  Gertsch et al. ............... 323/61 X FOREIGN PATENTS OR APPLICATIONS
409,139  9/1966  Switzerland .................. 323/93

Primary Examiner—Gerald Goldberg

[57] ABSTRACT

A high voltage power line is provided with a coupling capacitor for connecting a carrier system to the power line and for also providing a voltage divider to indicate the line voltage. The coupling capacitor usually comprises a series of individual capacitors that provide the necessary voltage rating. A load transformer has a primary winding connected across one of the capacitors of the series and has a secondary winding connected to an output load. A control load and a voltage indicator are coupled to the transformer. The indicated voltage is compared to a power line reference voltage, and the relative difference changes the control load so that a substantially constant load is presented to the transformer. Thus, its output voltage at its secondary winding supplying the output load is a more accurate indication of line conditions. When the power line voltage approaches zero, the reference voltage does also, and the control short-circuits the control load to cause the output voltage at the output load secondary winding to approach zero very quickly.

7 Claims, 4 Drawing Figures

CONTROL DEVICE FOR POWER LINE VOLTAGE MEASURING CIRCUIT

BACKGROUND OF THE INVENTION

My invention relates to a control device for power line voltage measuring circuits, and particularly to a control device that varies the load in the measuring circuit to improve the measured accuracy and to reduce transients.

In high voltage power line systems, it is desirable or necessary that the line voltage be accurately measured or indicated so that switching or other functions can be effected reliably without damage to the system. Typically, this measurement is made with a plurality of capacitors connected in series between the high voltage line and ground to form a voltage divider. The primary winding of a load transformer is connected across one of the capacitors in the series, usually the capacitor nearest ground. The load transformer is provided with one or more secondary windings which provide isolation and the desired voltage magnitude, usually reduced with respect to the primary voltage. Measuring or switching equipment is connected across a secondary winding. The impedance or load of this equipment may vary, and as it does so, the measured voltage also varies so as to decrease the accuracy of the measurement.

Accordingly, a primary object of my invention is to provide a new and improved control device that maintains the load on the load transformer substantially constant, thereby providing a more accurate voltage measurement.

In such a measuring circuit, if the line voltage is quickly reduced or short-circuited, the inductance of the load transformer and the capacitance of the series capacitor tend to maintain an appreciable voltage at the load transformer for a significant length of time. Thus, even though the line voltage may be zero, the load transformer supplies some voltage for a short time, and this voltage prevents or may prevent rapid switching or other necessary functions to take place even though the line voltage is zero.

Accordingly, another object of my invention is to provide a new and improved control device that causes the voltage on a load transformer to accurately and quickly reflect the line voltage conditions.

SUMMARY OF THE INVENTION

Briefly, these and other objects are achieved in accordance with my invention by a load transformer with a load secondary winding. A reference voltage that accurately reflects the power line voltage is compared to the secondary voltage produced by the transformer. When the secondary voltage is lower than the reference voltage, the difference is used to decrease a control load on the transformer. When the secondary voltage is higher than the reference voltage, the difference is used to increase the control load on the transformer. Thus, the load transformer sees a substantially constant load and produces a more accurate voltage measurement. When the power line voltage is suddenly reduced or short-circuited, the reference voltage follows this change immediately so that the secondary voltage due to the residual charge of the capacitor is momentarily extremely high with respect to the reference voltage. This large difference is used to short-circuit the control load to reduce transients and quickly and accurately reflect conditions on the power line.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
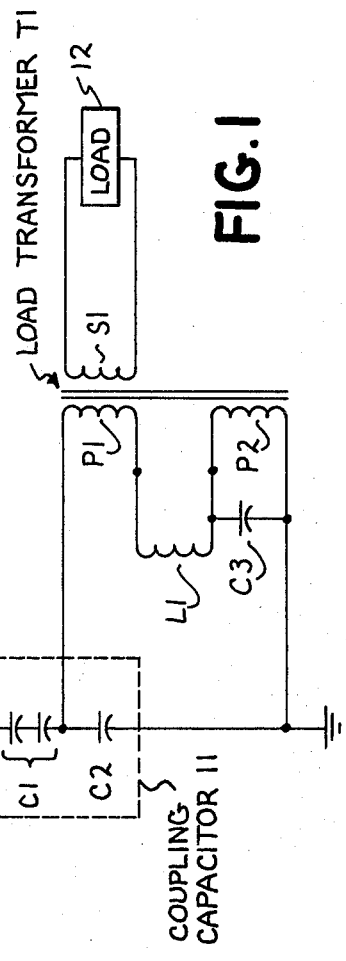
FIG. 1 shows an electrical circuit diagram of a prior art, high voltage measuring device.

Before describing my invention, I will describe a prior art, high voltage measuring device. In FIG. 1, I have shown such a device being used with a 60 Hz, high voltage transmission line 10. A coupling capacitor 11, indicated within the dashed line rectangle, is connected to the high voltage line 10, and to a point of reference potential such as ground. Usually, the coupling capacitor 11 comprises a series of substantially similar individual capacitors to provide the necessary voltage rating determined by the line 10. The capacitors nearest the line 10 are indicated by the legend C1, and the capacitor nearest ground is indicated by the legend C2. Since the capacitor C2 is nearest ground, it is the safest and most convenient for measuring the line voltage. If the capacitors in the series are similar, the line voltage is approximately equal to the measured voltage across the capacitor C2 multiplied by the total number of capacitors in the series. Terminals from the capacitor C2 are connected to a load transformer T1 which provides the desired isolation and voltage transformation. Typically, the transformer T1 comprises two primary windings P1, P2, each of which has one end connected to a respective side of the capacitor C2. A tuning inductor L1 is connected between the other ends of the primary windings P1, P2, and is used to tune out the capacity present in the circuit. A bypass capacitor C3 may also be connected between the lower end of the inductor L1 and ground. The transformer T1 may be provided with one or more secondary windings S1 which in a typical application are used to measure power or to control relays or other circuit devices, indicated generally as a load 12, which respond to an undervoltage or an overvoltage to cause appropriate switching or interruption of the high voltage line 10.

An examination of the known circuit of FIG. 1 will show that the voltage provided at the secondary winding S1 is frequency dependent. It will also show that the measured voltage across the secondary winding S1 will change as the nature or characteristic of the load 12 changes. And, the load 12 will frequently be changed in actual use because different types of devices may be connected to the secondary winding S1, depending upon the intended use. An examination of FIG. 1 will also show that if the voltage on the line 10 is suddenly reduced or short-circuited, the capacitance in the capacitor 11 and the inductance in the transformer windings and the inductor L1 tend to maintain some amount of transient voltage across the secondary winding S1 for an appreciable time, thus delaying some operation which may be necessary immediately after the voltage on the line 10 is reduced or short-circuited. Accordingly, I have invented a control device that can be used with the circuit of FIG. 1 to maintain the voltage measured by the transformer T1 at the proper value, and that quickly reduces the transient voltage at the transformer T1 in response to a reduction or short-circuiting of the voltage on the line 10. One embodiment of my control device is shown in FIG. 2, in which those parts that are the same as FIG. 1 have been given the same reference numerals or legends.

My control device requires a reference voltage which accurately and quickly indicates the true voltage on the high voltage line 10. Such a reference voltage can be derived in a number of known ways, one of which comprises a resistor R1 of the proper size and characteristic connected between the line 10 and ground. Another way, which uses a frequency independent capacitor circuit, is described in my copending application entitled "High Voltage Measuring Device" filed Apr. 8, 1974, Ser. No. 458,524. The primary winding of a reference transformer T2 is connected between ground and a suitable point on the resistor R1. The secondary winding of the transformer T2 is connected to the input terminals of a full wave rectifier bridge RB1. Positive voltage is derived from the bridge RB1 at an output terminal 13 and negative voltage is derived from the bridge RB1 at an output terminal 14. The positive output terminal 13 is connected to a common bus 15, and the negative output terminal 14 is connected through a resistor R2 to a voltage comparison bus 16. A filter capacitor C4 may be connected between the buses 16, 15.

The transformer T1 is provided with second and third secondary windings S2, S3. A voltage sensitive to load conditions on the transformer T1 is derived by the third secondary winding S3 and applied to the input terminals of a full wave rectifier bridge RB2. Positive voltage is derived from the bridge RB2 at an output terminal 17 and negative voltage is derived from the bridge RB2 at an output terminal 18. The positive output terminal 17 is connected through a resistor R3 to the comparison bus 16, and the negative output terminal 18 is connected to the common bus 15. It will be seen that the polarity of the voltage at the comparison bus 16 depends upon the relative magnitudes of the voltages supplied by the rectifier bridges RB1, RB2 and the relative sizes of the resistors R2, R3. If the line voltage is constant but the load 12 is increased, the circuit is arranged so that the decreased voltage at the secondary winding S3 causes the voltage on the comparison bus 16 relative to the common bus 15 to become more negative or less positive. Conversely, if the load 12 is decreased, the circuit is arranged so that the increased voltage at the secondary winding S3 causes the voltage on the comparison bus 16 relative to the common bus 15 to become more positive or less negative. This control voltage is applied to the gate electrode of a first NPN type transistor Q1 and is also applied through a resistor R4 to the gate electrode of a second NPN type transistor Q2. The gate electrode of the second transistor Q2 is suitably biased by a resistor R5 connected to the common bus 15. The transistor Q1 has its collector connected through an impedance, shown as a resistor R6, to one control terminal 20 of a loading bridge LB, and the transistor Q2 has its collector connected directly to the same terminal 20. The emitters of both transistors Q1, Q2, are connected to the bus 15 and to the other control terminal 21 of the loading bridge LB. The loading bridge LB comprises a full wave rectifier bridge having its other terminals 22, 23 connected to the secondary winding S2 so that the bridge LB can present an effective load for both polarities or half cycles of the 60 Hz power on the transformer T1. It will be seen that the load presented to the secondary winding S2 is determined by the impedance of the path between the control terminal 20 and the control terminal 21, and this impedance in turn is controlled by the conduction of the transistors Q1, Q2. If there is a large current conduction, a heavy load is presented to the secondary winding S2, and if there is a small or no current conduction, a small load is presented to the secondary winding S2.

Figure 2:
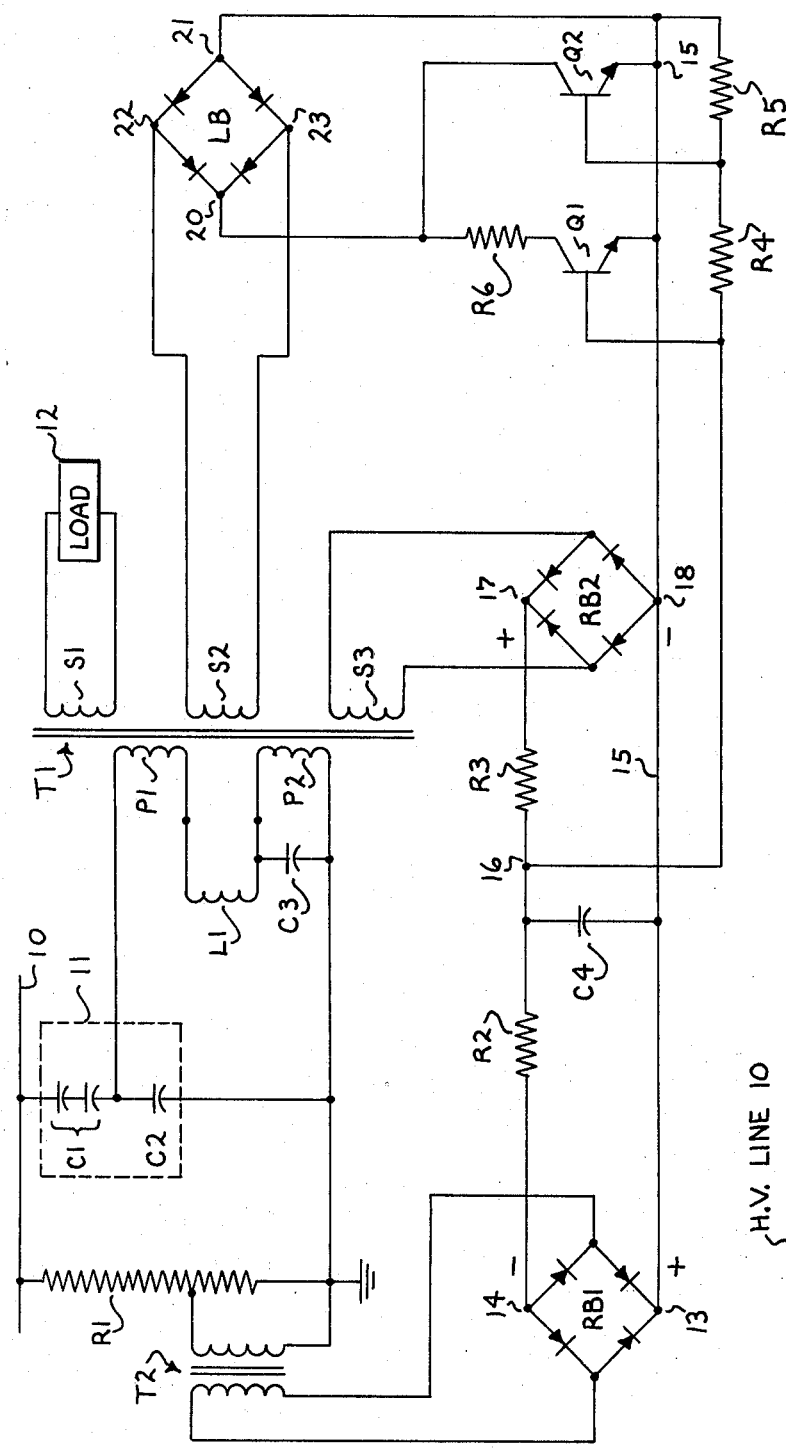
FIGS. 2, 3, and 4 show electrical circuit diagrams of control devices in accordance with my invention used with a high voltage measuring device.

My circuit shown in FIG. 2 can perform several functions for improving the operation of the load transformer T1. For example, if the load 12 is increased, the voltage at the secondary winding S2 decreases, so that the voltage on the comparison bus 16 relative to the common bus 15 becomes more negative or less positive. This reduces conduction through the transistor Q1 and reduces the load across the control terminals 20, 21, and this brings the voltage at the load winding S1 back up to a normal level. Conversely, if the load 12 is decreased, the voltage at the secondary winding S3 increases, so that the voltage comparison bus 16 relative to the common bus 15 becomes more positive, or less negative. This increases conduction through the transistor Q1 and increases the load across the control terminals 20, 21, and this brings the voltage at the load winding S1 back down to a normal level. These two operating conditions assume, of course, that the reference voltage stays constant as it typically would with a normally operating power line. Hence, the voltage produced by the secondary winding S1 can be made relatively stable, despite changes in the magnitude of the load 12. Generally, but not necessarily, I prefer to set the load conditions so that with the maximum current being supplied by the load winding S1, the voltage on the bus 16 causes the transistor Q1 to be turned off. Then, as the load conditions lighten, the bus 16 becomes more positive and increases the load across the control terminals 20, 21 so as to maintain the voltage across the secondary winding S1 relatively constant.

As mentioned earlier, without my circuit the inductive and capacitive elements in the prior art measuring circuits tend to maintain some transient voltage at the secondary winding S1 for some finite period, even though the voltage on the line 10 has been reduced or short-circuited. If the voltage on the line 10 is reduced or short-circuited, the reference resistor R1 reflects this condition rapidly and reduces the voltage produced by the rectifier bridge RB1. If the line voltage goes to zero, the voltage produced by the bridge RB1 also goes quickly to zero. This causes the voltage at the terminal 16 to become very positive, sufficiently so as to overcome the impedance of the resistor R4 and cause the transistor Q2 to conduct. Conduction of the transistor Q2 essentially short-circuits the control terminals 20, 21, so that the voltage on the secondary winding S1 quickly becomes zero. Hence, the load 12 properly and quickly reflects the true line voltage conditions.

Figure 3:
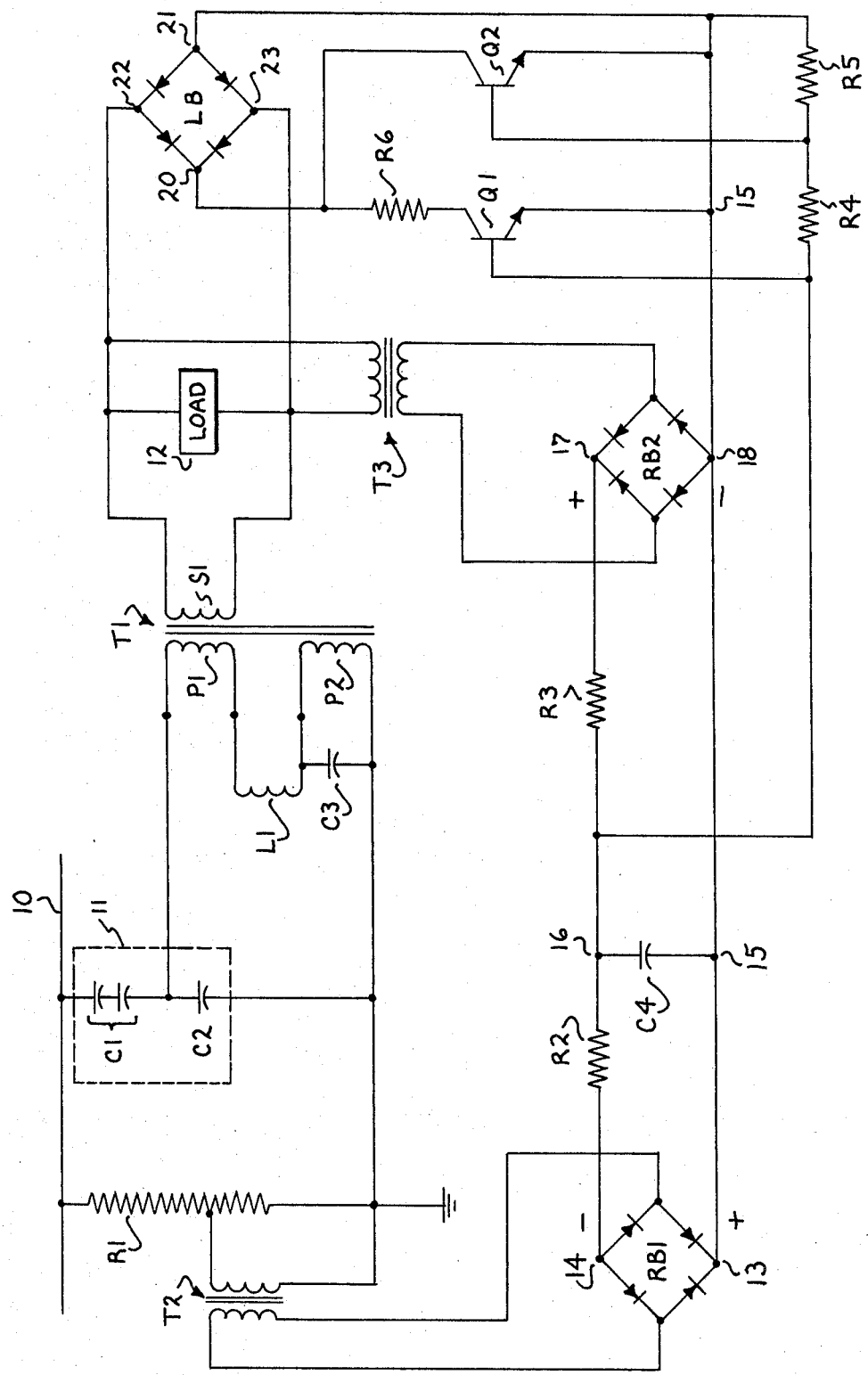

FIG. 3 shows another embodiment of my control device. In FIG. 3 the parts corresponding to those in FIG. 2 have been given the same reference numerals or legends. FIG. 3 is quite similar to FIG. 2, the main difference being that both the loading bridge LB and the rectifier bridge RB2 are connected across the load 12 so that the secondary windings S2, S3 of FIG. 2 are not needed. Thus, a voltage indicative of the voltage across the secondary winding S1 is applied either directly or through an isolation transformer T3 to the input terminals of the rectifier bridge RB2, and the amount of load presented by the loading bridge LB is applied directly to the secondary winding S1. The operation of the circuit of FIG. 3 is identical to the operation of the circuit of FIG. 2, so that no explanation is needed. The differences between the circuits of FIGS. 2 and 3 will suggest to persons skilled in the art that almost any combination of secondary windings for the transformer T1 can be provided in order to sense the voltage supplied by the transformer T1 and in order to provide the variable load to the transformer T1. I consider such other combinations to be part of my invention, even though I have not shown all of them.

Figure 4:
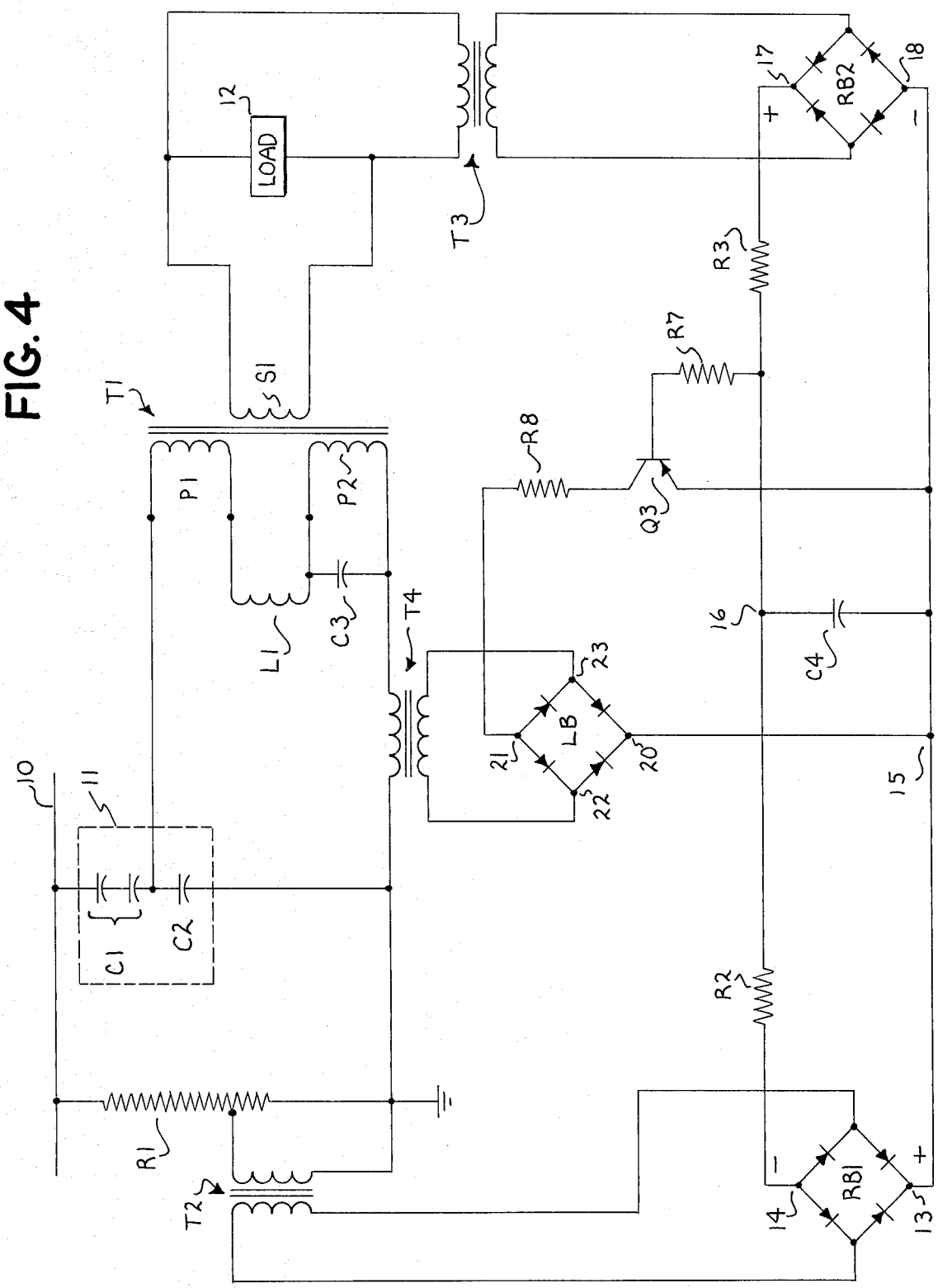

FIG. 4 shows still another embodiment in accordance with my invention in which the loading bridge LB is coupled through a transformer T4 in series with the primary side of the load transformer T1. In FIG. 4, parts corresponding to those in previous figures have been given the same reference numerals. The indication of the line voltage is provided by the rectifier bridge RB1, and the indication of the load voltage is provided by the rectifier bridge RB2. These voltages are compared as previously explained at the comparison bus 16, and this voltage is coupled through a resistor R7 to the base of a PNP type transistor Q3. The emitter of the transistor Q3 is connected to the reference bus 15 and one control terminal 20 of the loading bridge LB, and the collector of the transistor Q3 is connected through an impedance, shown as a resistor R8, to the other control terminal 21 of the loading bridge LB. The other terminals 22, 23 of the bridge LB are connected across one of the windings of the transformer T4. For a given load condition, and hence load voltage, the transistor Q3 presents a certain impedance to the transformer T4. If the load 12 is increased, its voltage will be decreased, and the voltage at the terminal 16 appears less positive or more negative. This causes greater conduction through the transistor Q3 so that the impedance presented by the transformer T4 is reduced. This raises the voltage at the primary of the transformer T1 so that the load voltage is raised to its rated magnitude. Conversely, if the load voltage increases, this causes the comparison bus 16 to become more positive or less negative. This causes the transistor Q3 to conduct less so that the transformer T4 presents a greater impedance. This lowers the voltage at the primary of the transformer T1 so that the load voltage is lowered to its rated magnitude. As explained in connection with the other figures, various combinations are also possible with FIG. 4. Thus, a separate secondary winding can be provided for sensing the load voltage. In addition, various combinations of FIG. 4 where the variable load is in series with the primary of the transformer T1 can be combined with various combinations of FIGS. 2 and 3 where the variable load is in parallel with the secondary of the transformer T1. Such changes and modifications can be made to meet the needs of a particular application.

It will thus be seen that I have provided a new and improved control circuit which causes load transformers to produce a relatively constant voltage despite changes in the load conditions at their secondary windings. My circuit also causes load transformers to indicate a reduced or short-circuited voltage condition very quickly, even though inductive circuits would otherwise tend to maintain a voltage. While I have shown only one embodiment of my invention, persons skilled in the art will appreciate that modifications may be made. As mentioned, various combinations of circuits can be used to load the transformer T1 as long as they operate on the relative voltages of the transformer load condition and the line condition in accordance with my invention. Various types of load circuits can be used. Transistors can be added to provide gain between the comparison bus 16 and the load transistors Q1, Q2, Q3. Different types of transistors can be used if polarity requirements are observed. And, the base electrodes may be provided with an external bias voltage to establish the desired operating parameters. Therefore, while my invention has been described with reference to particular embodiments, it is to be understood that modifications may be made without departing from the spirit of the invention or from the scope of the claims.

What I claim as new and desire to secure by Letters Patent of the United States is:

1. In a power line measuring system having a coupling capacitor, an improved control circuit comprising:
   a. a load transformer having a primary winding and a secondary winding coupled thereto;
   b. means adapted to couple said primary winding across one of the capacitors of the coupling capacitor;
   c. means for deriving a reference voltage from the power line;
   d. means for coupling a load to said secondary winding;
   e. a controllable load coupled to said transformer, said controllable load having control terminals for receiving control signals to vary the magnitude of said controllable load;
   f. means coupled to said transformer for deriving a load voltage therefrom;
   g. means for comparing said reference voltage and said load voltage and producing a control signal having a magnitude that varies as a function of the relative magnitudes of said load voltage and said reference voltage;
   h. and means coupling said control signal to said control terminals of said controllable load for changing said load as a function of said control signal magnitude.

2. The improved control circuit of claim 1 wherein said controllable load is connected in series with a primary winding of said transformer.

3. The improved control circuit of claim 1 wherein said controllable load is connected in parallel with a secondary winding of said transformer.

4. In a power line measuring system having a coupling capacitor, an improved control circuit comprising:
   a. a load transformer having a primary winding and at least one secondary winding coupled thereto;

b. means adapted to couple said primary winding across one of the capacitors of the coupling capacitor;
c. means for deriving a reference voltage from the power line;
d. means for coupling a load to a secondary winding;
e. a controllable load coupled in series with said primary winding, said controllable load having control terminals for receiving control signals to vary the magnitude of said controllable load;
f. means coupled to a secondary winding for deriving a transformer load voltage therefrom;
g. means for comparing said reference voltage and said transformer load voltage and producing a control signal having a magnitude that varies as a function of the relative magnitudes of said transformer load voltage, and said reference voltage;
h. and means coupling said control signal to said control terminals of said controllable load for decreasing the voltage applied to said primary winding in response to an increase of said transformer load voltage relative to said reference voltage and for increasing the voltage applied to said primary winding in response to a decrease of said transformer load voltage relative to said reference voltage.

5. In a power line measuring system having a coupling capacitor, an improved control circuit comprising:
a. a load transformer having a primary winding and at least one secondary winding coupled thereto;
b. means adapted to couple said primary winding across one of the capacitors of the coupling capacitor;
c. means for deriving a reference voltage from the power line;
d. means for coupling a load to a secondary winding;
e. a controllable load coupled in parallel with a secondary winding, said controllable load having control terminals for receiving control signals to vary the magnitude of said controllable load;
f. means coupled to a secondary winding for deriving a transformer load voltage therefrom;
g. means for comparing said reference voltage and said transformer load voltage and producing a control signal having a magnitude that varies as a function of the relative magnitudes of said transformer load voltage and said reference voltage;
h. and means coupling said control signal to said control terminals of said controllable load for decreasing said transformer load voltage in response to a prior increase of said transformer load voltage relative to said reference voltage and for increasing said transformer load voltage in response to a prior decrease of said transformer load voltage relative to said reference voltage.

6. The improved control circuit of claim 5 wherein said load coupling means, said controllable load, and said deriving means are coupled to a common secondary winding.

7. The improved control circuit of claim 5 wherein said load coupling means, said controllable load, and said deriving means are each coupled to a separate, respective secondary winding.

* * * * *